United States Patent Office 3,406,414
Patented Oct. 22, 1968

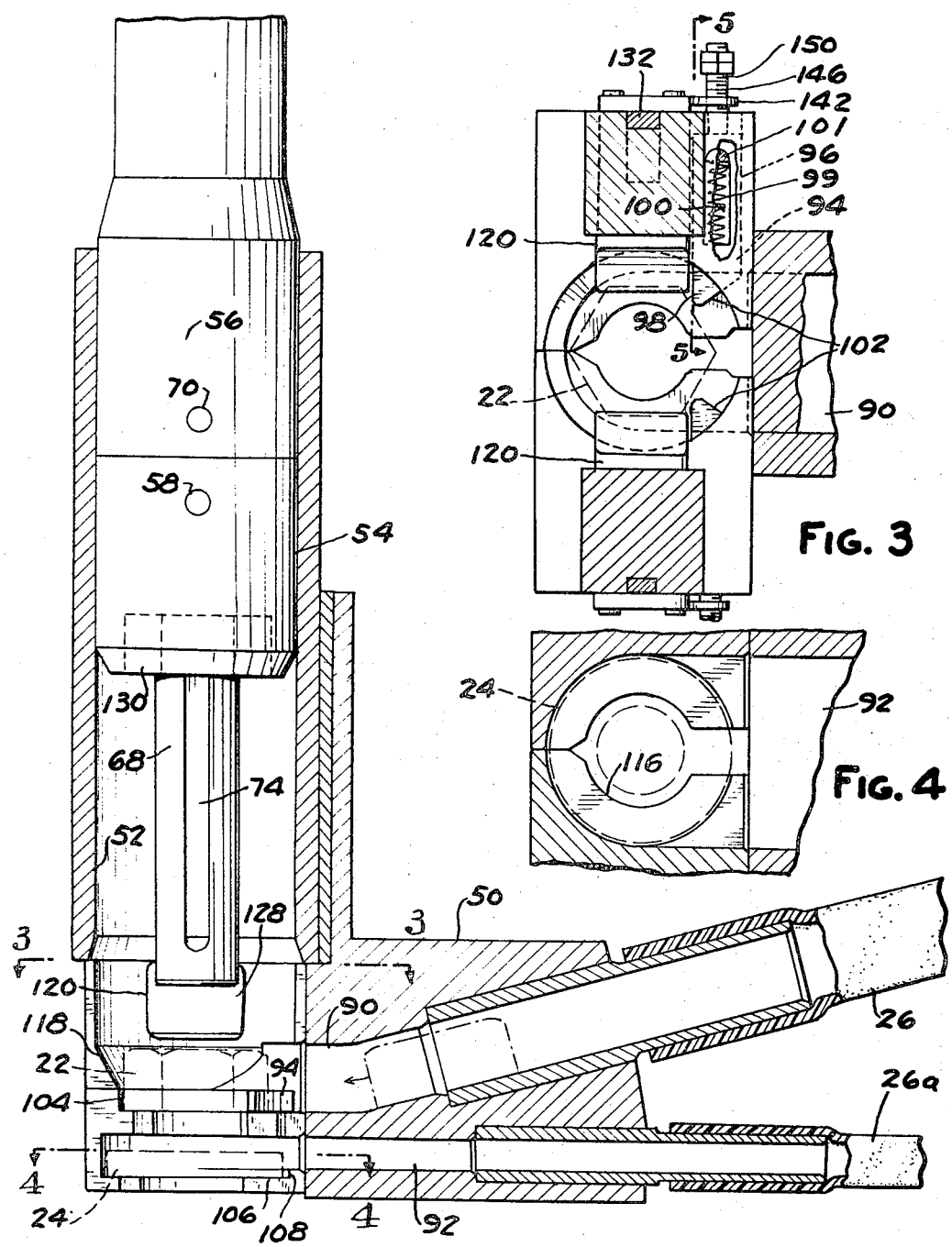

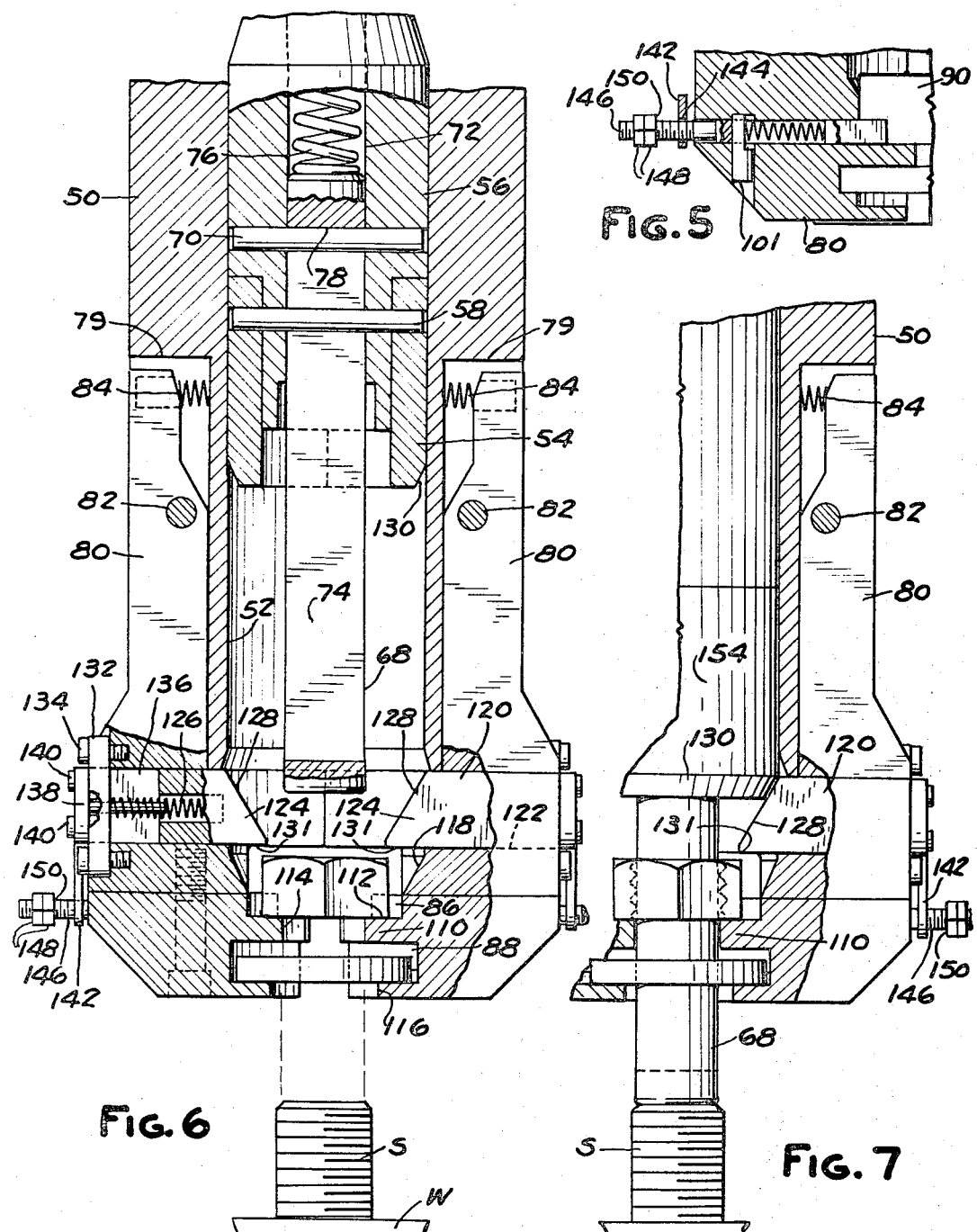

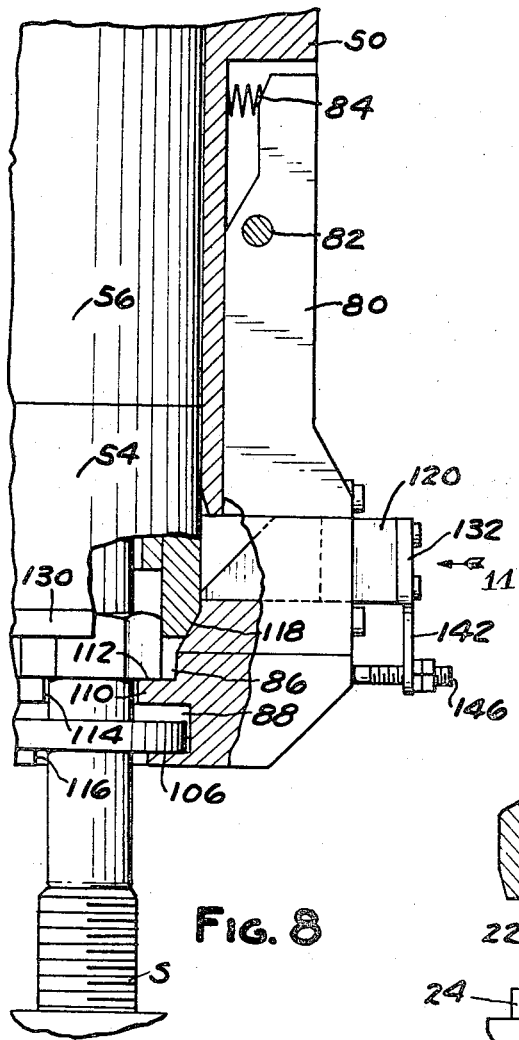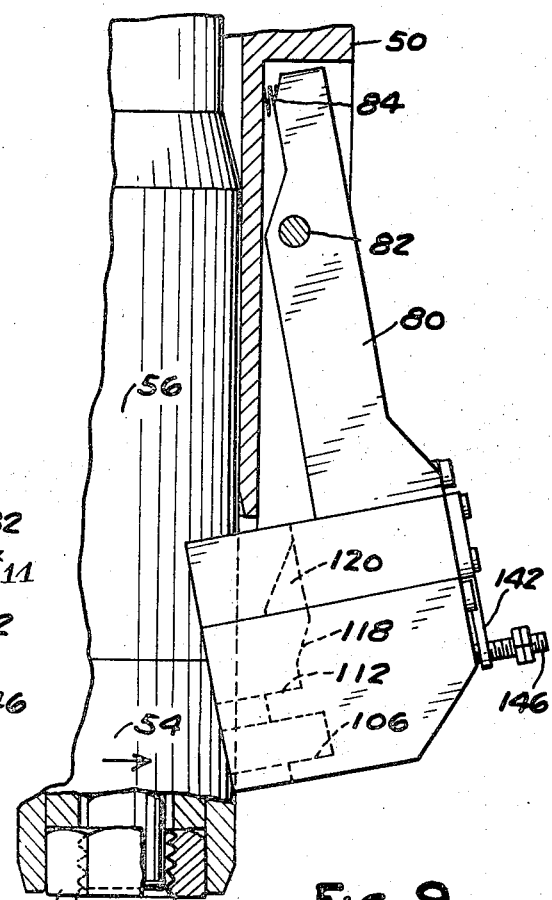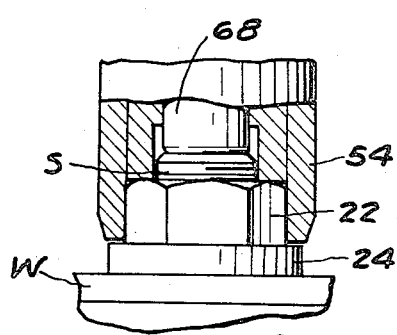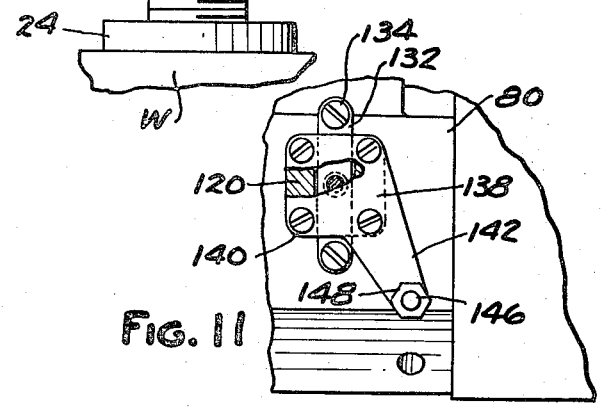

1

3,406,414
APPARATUS FOR ASSEMBLING NUTS AND WASHERS OR THE LIKE ON BOLTS OR THE LIKE
Sylvester Kulaga and Richard T. Coapman, Utica, and Murdo A. MacDonald, Bloomfield Hills, Mich., assignors to Tru-Tork, Inc., Troy, Mich., a corporation of Michigan
Filed May 12, 1966, Ser. No. 549,657
18 Claims. (Cl. 10—155)

ABSTRACT OF THE DISCLOSURE

A pair of opposed jaws define a nut-receiving chamber and a washer-receiving chamber axially aligned with a rotatable nut-running socket. Nuts are fed one at a time through an inlet into the nut chamber, the inlet being provided with a deflectable barrier which contains the nut against rebound when the nut enters the chamber. A second barrier between the nut chamber and socket contains the nut against tilting in the chamber. Both barriers and the jaws retract responsive to advancement of the nut-running socket to release the nut and washer for advancement and assembly on a bolt.

---

This invention relates generally to equipment for feeding nuts and washers or the like one at a time from a source to an apparatus which applies the parts to a work such as a bolt, threaded stud, or the like. More particularly, the invention involves the part-applying apparatus.

It is conventional to run a nut onto a bolt by the use of a rotating socket engaged around the nut and advanced toward the bolt. The socket, of necessity, has a diameter greater than that of the nut. This creates a problem where the nut is to be fed to a position in alignment with the socket and held there mechanically as distinguished from manually. Somehow, clearance must be provided around the nut to enable the socket to advance into driving engagement around the nut. Moreover, the path of advancement of the socket toward the nut must be free of obstruction. Leaving such free area around the nut would enable the nut to come to rest out of alignment with the socket and also to tilt axially to a position in which it could not be properly engaged by the socket.

This situation is particularly objectionable in equipment intended to operate automatically and is aggravated when the apparatus is so disposed that the nut axis is angled to the vertical. The problem is further aggravated where the nut is propelled into alignment with the socket with some velocity, as by pneumatic means, since the nut tends to rebound from whatever stops it in its intended position and may even flip over 180°. This rebound characteristic tends to cause the nut to bounce back into the inlet or way through which the nut was transported to its intended position in alignment with the socket.

One object of the invention is to provide a relatively simple, inexpensive nut-applying apparatus improved to overcome the above objectionable characteristics. Another object of the invention is to provide such an apparatus further improved to enable a nut and another article such as a washer to be applied simultaneously to a threaded work.

Generally, the invention contemplates the use of a body having a rotatable nut-running socket mounted for advancement toward a chamber which receives and holds a nut in alignment with the socket. Adjacent the chamber are means positioned to engage the nut and contain it against tilting axially out of its intended alignment. These means are releasable from nut-engaging position responsive to advancement of the socket to enable the socket to engage the nut.

The chamber has an inlet with a gate arranged to deflect to permit a nut to enter the chamber but to prevent the nut from bouncing back out of the chamber. This gate is retractable to enable the socket to engage the nut. The nut is contained in the chamber by a barrier until after the nut is engaged by the socket; and upon continued advancement of the socket, the barrier is retracted so that it and an engaged nut can pass through an outlet opening. A second chamber for a washer or the like is aligned with the first chamber in the path of movement of the socket, this chamber also having an inlet, a retractable barrier, and an outlet.

One form of the invention is shown in the accompanying drawings.

FIG. 2 is, in general, an enlarged, vertical central sectional view of a lower portion of the apparatus shown in FIG. 1.

FIG. 3 is a fragmentary, sectional view on line 3—3 of FIG. 2.

FIG. 4 is a fragmentary, sectional view on line 4—4 of FIG. 2.

FIG. 5 is a sectional view on line 5—5 of FIG. 3.

FIG. 6 is, in general, a fragmentary, sectional view on a line perpendicular to the section of FIG. 2.

FIG. 7 is a fragmentary view similar to FIG. 6 but showing certain parts in different relation.

FIG. 8 is a view similar to FIG. 7 but showing a different relation of the parts.

FIG. 9 is a view similar to FIGS. 7 and 8 but showing a different relation of the parts.

FIG. 10 is a fragmentary view illustrating a nut and washer applied to a work.

FIG. 11 is a fragmentary, elevational view in the direction of arrow 11, FIG. 8, with parts broken away to illustrate structural details.

Figure 1:
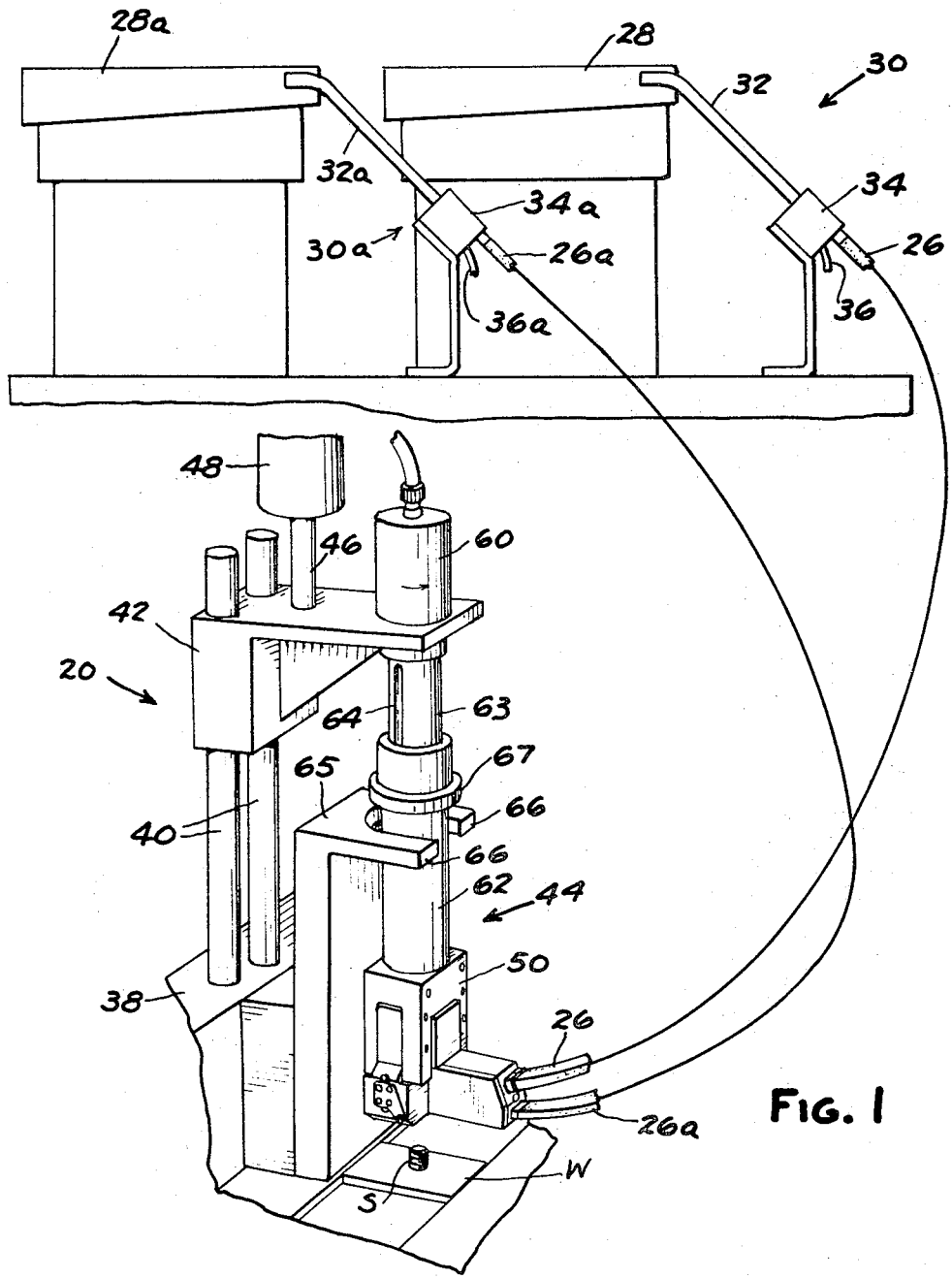
FIG. 1 is a partly diagrammatic view, partly in perspective, and partly in elevation, illustrating apparatus according to the present invention.

Shown in the drawings is an apparatus 20 for applying a nut 22 and a washer 24 to a threaded stud S on each of a succession of workpieces W. The nuts are fed one at a time to apparatus 20 through a pneumatic tube 26 from a hopper 28 by means of a feeding device 30. The feeding device comprises a track 32 into which the nuts are introduced from hopper 28 and a transfer mechanism 34 which transfers nuts one at a time from track 32 into tube 26 and introduces air under pressure into the tube from a conduit 36 to propel the nut to apparatus 20. Washers 24 are fed to apparatus 20 by means of similar equipment 26a–36a. Hoppers 28 and 28a are shown as being of the conventional vibratory type. Transfer mechanisms 34 and 34a may be of the type shown in copending application Ser. No. 467,866, filed June 29, 1965, which has issued as U.S. Patent 3,275,191, or Ser. No. 472,841, filed July 19, 1965, which has issued as U.S. Patent 3,311,262.

Apparatus 20 comprises a base 38 which supports a pair of upwardly projecting rods 40 providing guides for a crosshead 42 vertically slidable thereon. The crosshead supports a unit 44 which receives nuts 22 and washers 24 and applies them to stud S. Crosshead 42 and unit 44 are shifted vertically by such means as a piston rod 46 projecting from a fluid-pressure motor cylinder 48.

Unit 44 comprises a body 50 having an internal cylindrical guideway 52 for a nut-running socket 54 pinned to a drive shaft 56 as at 58. Shaft 56 is rotated by a motor 60 illustrated as being an air motor. Body 50 has an upward tubular extension 62 into which a guide tube 63 telescopes. Tube 63 is anchored on crosshead 42. Tubes 62 and 63 are secured against relative rotation by means of a keyway 64 engaged with a conventional key (not shown) to maintain unit 44 in its proper angular orientation. Shaft 56 passes through and is rotatable within tubes 62, 63.

Mounted on base 38 is a stationary yoke 65 having fingers 66 which straddle tube 62 and between which tube 62 is vertically movable. Tube 62 is provided with a collar 67 having a diameter greater than the distance between fingers 66 so that after downward movement of unit 44 through a predetermined distance, the collar will bottom against yoke 65 and tube 63 will continue to move downwardly for a purpose to be described.

A probe 68 is pinned at 70 to rotate with shaft 56. The probe is longitudinally slidable in a bore 72 in shaft 56 and has a longitudinal slot 74 which clears pins 58 and 70 to facilitate relative longitudinal movement of the probe and socket. A compression spring 76 in bore 72 biases the probe outwardly of socket 54. Outward movement of the probe is limited by engagement of an end 78 against pin 70 (FIG. 6).

Body 50 has recessing 79 within which a pair of jaws 80 are pivotally mounted by means of pivot pins 82. The lower ends of the jaws, as the drawings are viewed, are biased toward relatively closed condition by compression springs 84 disposed between the upper end portions of the jaws and body 50.

The lower end portions of the jaws have apposed internal recessing which cooperate, in closed condition of the jaws, to define a first chamber 86 for receiving a nut 22 and a second chamber 88 for receiving a washer 24. Body 50 has a passageway 90 forming an inlet through which nuts are passed into chamber 86 and a passageway 92 forming an inlet by which washers are passed into chamber 88. Passageways 90 and 92 are in pneumatic communication respectively with tubes 26 and 26a.

A pair of slides 94 are contained in ways 96 in jaws 80. Each of these slides has an end portion 98 (FIG. 3), which, under the bias of a compression spring 99, projects into the path of movement of a nut entering chamber 86 from passageway 90. Each spring 99 is disposed in a slot 100 in slide 94 and reacts against an abutment pin 101 having a portion which projects into the slot. End portions 98 are provided with cam surfaces 102 facing upstream of inlet 90. A nut en route to chamber 86 cams slides 94 out of the way; and when the nut has entered the chamber, the slides snap back to the FIG. 3 position to contain the nut within the chamber.

Slides 94 and a lower portion 104 of chamber 86 (FIG. 2) cooperate to position a nut 22 so that its central opening is aligned with probe 68. Slides 94 cooperate to provide a barrier which prevents a nut from rebounding out of chamber 86 into inlet 90. Bottom wall 106 of washer chamber 88 is recessed to provide a shoulder 108 (FIG. 2) which provides a barrier preventing washer 24 entering the chamber from rebounding out of the chamber into inlet 92. Chambers 86 and 88 have a common wall 110 which defines the bottom wall 112 of chamber 86. Jaws 50 are provided with apposed recessing which cooperate to define openings 114 and 116 aligned with probe 68. Chamber 86 has an upper portion 118 dimensioned to receive socket 54 and the walls of which are tapered to provide cam surfaces as shown.

A pair of slides 120 are contained within ways 122 in jaws 80. These jaws have end portions 124 which are biased by compression springs 126 toward an inward position (FIG. 6) in the path of movement of socket 54 between guideway 52 and upper portion 118 of nut chamber 86. The upper edge 128 of each slide end is angled to provide a cam surface for engagement by a cam surface 130 adjacent the lower edge of socket 54. The lower edge portion 131 of each slide projects over the upper face of the nut in chamber 86 for a purpose to be described. Spring 126 seats against slide 120 and a retainer 132 bolted to jaw 80 at 134. Each slide has a central longitudinal slot 136 which straddles retainer 132 to facilitate movement of the slide to the outward position of FIG. 8.

It will be noted that in order for ends 98 of slides 94 to serve as positioners for a nut in chamber 86, they project into the path of advancement of socket 54. To retract slides 94 out of the path of the socket, a mechanical connection is provided between slides 120 and slides 94. This connection is illustrated as including a plate 138 secured to the outer end of each slide 120 by screws 140, this plate having an extension 142 provided with an opening 144 (FIG. 5) through which a threaded stud 146 on slide 94 freely passes.

A pair of nuts 148 tightened against each other on stud 146 provide an adjustably positioned shoulder 150 for engagement by plate extension 142. When slides 120 move outwardly, plate extensions 142 are carried therewith into engagement with shoulders 150, and upon further outward movement of slides 120, slides 94 are retracted. The lost-motion connection between slides 120 and 94 is provided in the illustrated apparatus, since slides 120 travel outwardly a greater distance than slides 94 in clearing the path of socket 54.

In use, it may be assumed that hoppers 28 and 28a are in operation so that a train of nuts and washers are in tracks 32 and 32a respectively. Crosshead 42 and unit 44 are in the upward position of FIG. 1 with collar 67 out of engagement with yoke fingers 66. The internal parts of unit 44 are in the positions illustrated in FIGS. 2–6. A workpiece W is in position beneath unit 44.

Upon actuation of transfer mechanisms 34 and 34a, a nut is propelled through tube 26 and a washer through tube 26a by compressed air. A nut, in passing from inlet 90 into chamber 86, deflects slides 94 outwardly and springs 99 snap slides 94 back into the FIG. 3 position after the nut has entered chamber 86 to prevent the nut from rebounding out of chamber 86 toward inlet 90.

Were it not for slides 120, the nut at this time could and very likely would tilt on its axis to an edgewise position or to a position flipped over 180°. However, the lower edge portion 131 of the slide projecting over and relatively closely adjacent the top face of the nut cooperates with the bottom wall 112 of chamber 86 to prevent such tilting and to maintain the nut in its proper orientation.

When washer 24 enters chamber 88, it drops onto downwardly recessed bottom wall 106 and thereafter lip 108 prevents the washer from bouncing back into inlet 92.

With motor 60 in operation to rotate socket 54, cylinder 48 is actuated to lower crosshead 42 and unit 44. The entire unit lowers as a whole until its lower end is in proximity to threaded stud S. Then collar 67 bottoms against yoke fingers 66 and downward movement of tube 62, body 50, and jaws 80 is halted.

Upon continued lowering of crosshead 42, shaft 56, socket 54, and probe 68 advance downwardly relative to the body and jaws 80 toward nut 22 and washer 24. First the probe passes through chambers 86 and 88 and the nut and washer therein until the lower end of the probe engages stud S (FIG. 7). At about the same time, cam surface 130 on socket 54 comes into engagement with cam surfaces 128 on slides 120. Upon continued advancement of the socket downwardly, slides 120 are forced outwardly by cams 128, 130 from the position of FIG. 7 to the position of FIG. 8. After initial outward movement of slides 120, plate extensions 142 thereon engage nut faces 150; and upon continued outward movement, slides 120 operate to retract slides 94 out of the path of movement of socket 54. The path of the socket is now clear so that it can advance into engagement with nut 22.

Socket 54 drivingly engages around the nut when it enters the upper portion of chamber 86; and thereafter, cam surfaces 130 on the socket engage cam surfaces 118 in the upper portion of chamber 86. The position of the parts at this time is illustrated in FIG. 8. Upon continued advancement of socket 54, jaws 80 are forced apart by the interengaged cam surfaces from the closed position of FIG. 8 to the open position of FIG. 9. Bottom walls 112 and 106 of chambers 86 and 88 respectively, which in closed condition of the jaws formed barriers obstructing movement of the nut and washer out of the jaws, are now retracted so that the washer, socket, and nut engaged therein can advance out of the jaws toward stud S.

When jaws 80 attain the open position of FIG. 9, washer 24 drops onto workpiece W around stud S. Socket 54 then carries nut 22 downwardly and threads it onto stud S (FIG. 10). In transition of the parts from the FIG. 7 position to the FIG. 10 position, bore 72 in shaft 56 advances downwardly around probe 68 against the action of spring 76.

After the nut and washer have been assembled on workpiece W as described, motor cylinder 48 is reversed to elevate crosshead 42 and unit 44. As socket 54 retracts upwardly as the drawings are viewed, jaws 80 close under the action of springs 84, slides 120 and 94 return inwardly under the action of springs 126 and 99 respectively, and the parts are again in the relative positions shown in FIGS. 2–6. Upon continued upward movement of crosshead 42, unit 44 returns as a whole to the position of FIG. 1 wherein collar 67 is elevated out of engagement with yoke fingers 66.

Thereafter, a new workpiece W is positioned beneath unit 44 and feeding mechanisms 34, 34a are actuated to deliver a new nut 22 and washer 24 to chambers 86, 88 respectively. The cylinder 48 is actuated to lower and raise unit 44 to apply the new nut and washer to the new workpiece and return the unit to its upward, retracted position. In general, feeding mechanisms 34, 34a and unit 44 are operated in alternate sequence to apply a nut and washer to a succession of workpieces.

We claim:
1. Nut-applying apparatus comprising
 a body having means defining a chamber having an inlet through which nuts may pass one at a time,
 means providing a barrier operable to obstruct exit from said chamber of a nut introduced into said chamber through said inlet,
 means providing a nut-running socket dimensioned and configured to fit drivingly around a nut with which said apparatus is adapted to be used,
 said socket being mounted for movement into said chamber for engagement with a nut obstructed by said barrier,
 containing means positioned to engage a nut in said chamber and contain the same against axial turning in said chamber,
 motor means operable to rotate said socket and advance the same toward said chamber,
 said containing means being releasable from nut-engaging position responsive to advancement of said socket toward engagement with said nut,
 said barrier being releasable responsive to continued advancement of said socket to free a nut engaged in said socket for passage out of said chamber.

2. The combination defined in claim 1 wherein said barrier is positioned to engage one end face of the nut and said containing means is positioned to engage the opposite end face thereof.

3. The combination defined in claim 1 wherein said containing means is movably mounted on said body in the path of advancement of said socket, said containing means being movable out of said path and out of said position thereof responsive to advancement of said socket.

4. The combination defined in claim 3 wherein said containing means and socket have interengageable means operable to cam said containing means out of said path and position.

5. The combination defined in claim 3 and including in addition means providing a retractable second barrier upstream of said chamber effective to obstruct retrograde movement of a nut from said chamber into said inlet, said second barrier having portions disposed within said path of advancement, and retracting means operable responsive to advancement of said socket toward engagement with the nut to retract said second barrier from said path.

6. The combination defined in claim 5 wherein said retracting means includes a connection between the two elements defined as said containing means and said second barrier, one of said elements and said connection being cooperable upon movement of said one element out of said path to remove said other element therefrom.

7. The combination defined in claim 6 wherein said one element comprises said containing means and said other element comprises said second barrier.

8. The apparatus defined in claim 1 wherein said chamber is defined by jaws on said body relatively movable between closed and open relation,
 said barrier comprising shoulders on said jaws,
 said containing means being carried by said jaws and being movable from said position while said jaws are in closed relation,
 said jaws being movable to open relation responsive to said continued advancement of said socket,
 said shoulders being retractable from obstructing relation to a nut responsive to opening movement of said jaws.

9. The apparatus defined in claim 1 wherein a pair of jaws are pivotally mounted on said body for relative movement between closed and open relation, said jaws being spring biased toward closed relation,
 said jaws having apposed recessed portions which cooperate to define said chamber and having apposed shoulders which cooperate to define said barrier,
 said shoulders being positioned to engage one end face of a nut in said chamber,
 a slide on each jaw spring biased to an inward position and being movable to an outward position against the spring bias,
 each slide in said inward position having a portion positioned for engagement with the opposite end face of a nut in said chamber and thereby providing said containing means, said socket and slides having interengageable cam surfaces by which said slides are cammed to said outward position and clear of a nut in said chamber upon said advancement of said socket,
 said socket and jaws having cam means relatively positioned to interengage subsequent to advancement of said socket into engaged relation around a nut,
 the latter-said cam means, responsive to said continued advancement of said socket, being cooperable to move said jaws to open relation and thereby retract said shoulders from obstructing relation to a nut and free the same for movement out of said chamber by said socket.

10. The combination defined in claim 9 wherein a second slide is mounted on each jaw for movement substantially parallel to the movement of the respective first-mentioned slide,
 each second slide having a portion positioned to engage a side face of a nut in said chamber which faces toward said inlet, said second slides thereby cooperating to provide a second barrier which obstructs retrograde movement of a nut from said chamber into said inlet,
 the portions of said second slides forming said second barrier being disposed in said path of movement of said socket,
 each of the first-mentioned slides having a mechanical connection with its respective second slide,
 each first slide and mechanical connection being cooperable responsive to outward movement of said first slide to retract said second slide from said path of advancement of said socket.

11. The apparatus defined in claim 10 wherein said second slides are spring biased toward an inward position in which they provide said second barrier, said second slides being shiftable outwardly independently of said first slides responsive to movement of a nut in a direction from said inlet toward said chamber, whereby to admit a nut to said chamber, and being spring returned to said inward position when the nut has entered said chamber.

12. The apparatus defined in claim 1 and including in addition means providing a shiftable second barrier upstream of said chamber having one position in which it is effective to obstruct retrograde movement of a nut from said chamber into said outlet, said second barrier in said one position having portions disposed in said path of advancement of said socket, said second barrier having another position in which it is clear of said path, operating means operable to shift said second barrier from said one position to said other position thereof responsive to advancement of said socket toward engagement with a nut in said chamber, said second barrier being shiftable from said one position to said other position independently of said operating means responsive to movement of a nut in a direction from said inlet toward said chamber, whereby to admit a nut to said chamber, said second barrier being spring biased to return to said one position when the nut has entered said chamber.

13. The apparatus defined in claim 1 wherein said body has means defining a second chamber having a second inlet through which may pass one at a time an article such as a washer with which a nut in the first-mentioned chamber is to be assembled on a bolt or the like, means providing a second barrier operable to obstruct exit of an article in said second chamber, said first and second chambers being aligned in said path of movement of said socket, said second barrier being releasable responsive to said continued advancement of said socket to free an article in said second chamber for passage therefrom.

14. The apparatus defined in claim 13 wherein said body has a wall disposed between said first and second chambers, said wall having portions defining said first barrier.

15. The apparatus defined in claim 13 wherein a probe projects from the center of said socket toward said chambers, said chambers having openings aligned with said probe, said probe being diametered to pass through said chamber openings and the openings in a nut and article in the respective chambers, said probe having such a length that it penetrates through both of said chamber openings prior to release of said barriers, said probe providing a guide for movement of a nut and article released by said barriers to a workpiece.

16. The apparatus defined in claim 13 wherein said first and second inlets are disposed substantially on the same sides of their respective chambers.

17. The apparatus defined in claim 13 wherein said chambers are defined by jaws on said body relatively movable between closed and open relation, said first and second barriers comprising shoulders on said jaws, said first and second inlets being disposed transversely of the direction of relative movement of said jaws.

18. The apparatus defined in claim 17 wherein said first and second inlets are disposed on the same sides of their respective chambers.

References Cited

UNITED STATES PATENTS

| | | | |
|---|---|---|---|
| 2,046,520 | 7/1936 | Lundell | 10—155 |
| 2,628,520 | 2/1953 | Bailey et al. | 81—54.3 |
| 2,763,173 | 9/1956 | Bailey et al. | 81—54.3 |

LEONIDAS VLACHOS, *Primary Examiner.*